US006137864A

United States Patent [19]

Yaker

[11] Patent Number: 6,137,864

[45] **Date of Patent: *Oct. 24, 2000**

[54] SPECIFIABLE DELETE TIMES FOR VOICE MESSAGING

[75] Inventor: Rhoda Yaker, Annandale, N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/900,793

[22] Filed: Jul. 25, 1997

[51] Int. Cl.[7] .................................................... H04M 1/64

[52] U.S. Cl. .................................... 379/88.22; 379/88.23

[58] Field of Search ............................... 379/67.1, 88.12, 379/88.16, 88.18, 88.22, 88.23, 88.24, 88.25, 88.26

[56] References Cited

U.S. PATENT DOCUMENTS

| | | | |
|---|---|---|---|
| 4,972,461 | 11/1990 | Brown et al. | 379/67 |
| 5,107,419 | 4/1992 | MacPhail . | |
| 5,315,504 | 5/1994 | Lemble . | |
| 5,325,310 | 6/1994 | Johnson et al. . | |
| 5,414,757 | 5/1995 | Thompson | 379/88 |
| 5,646,982 | 7/1997 | Hogan et al. | 379/89 |
| 5,787,151 | 7/1998 | Nakatsu et al. | 379/67 |
| 5,794,253 | 8/1998 | Norin et al. . | |
| 5,805,671 | 9/1998 | Ohuchi | 379/67 |
| 5,832,220 | 11/1999 | Johnson et al. . | |

*Primary Examiner*—Scott L. Weaver
*Attorney, Agent, or Firm*—Steve Mendelsohn

[57] ABSTRACT

A voice messaging system enables a callee to specify a retention time for retaining a stored voice message from a caller. The system then automatically deletes the stored voice message after the expiration of the retention time. In one embodiment, the caller is able to specify one retention time when the message is first recorded, and the callee can change that retention time when the message is retrieved. If the message is not retrieved by the callee before the caller-specified retention time expires, the system will automatically delete the message. In one embodiment, a callee can also assign a retention time to an outgoing voice message for playback to subsequent callers. The present invention improves the operations of a voice messaging system with limited memory resources, by reducing the chances that the system's memory will become filled with old messages which would leave the system unable to store new messages from callers.

36 Claims, 2 Drawing Sheets

302 QUERY CALLEE FOR PLAYING BACK VOICE MESSAGE

304 TRANSMIT STORED VOICE MESSAGE TO CALLEE

306 QUERY CALLEE FOR DELETING OR SAVING VOICE MESSAGE

308 SAVE MESSAGE? NO → 310 DELETE MESSAGE WITH TEMPORARY RETRIEVAL OPTION; YES

312 QUERY CALLEE FOR TIME PERIOD TO SAVE VOICE MESSAGE

314 QUERY CALLEE FOR MESSAGE IDENTIFIER

316 SAVE VOICE MESSAGE WITH MESSAGE IDENTIFIER

318 DELETE VOICE MESSAGE AFTER SPECIFIED TIME PERIOD

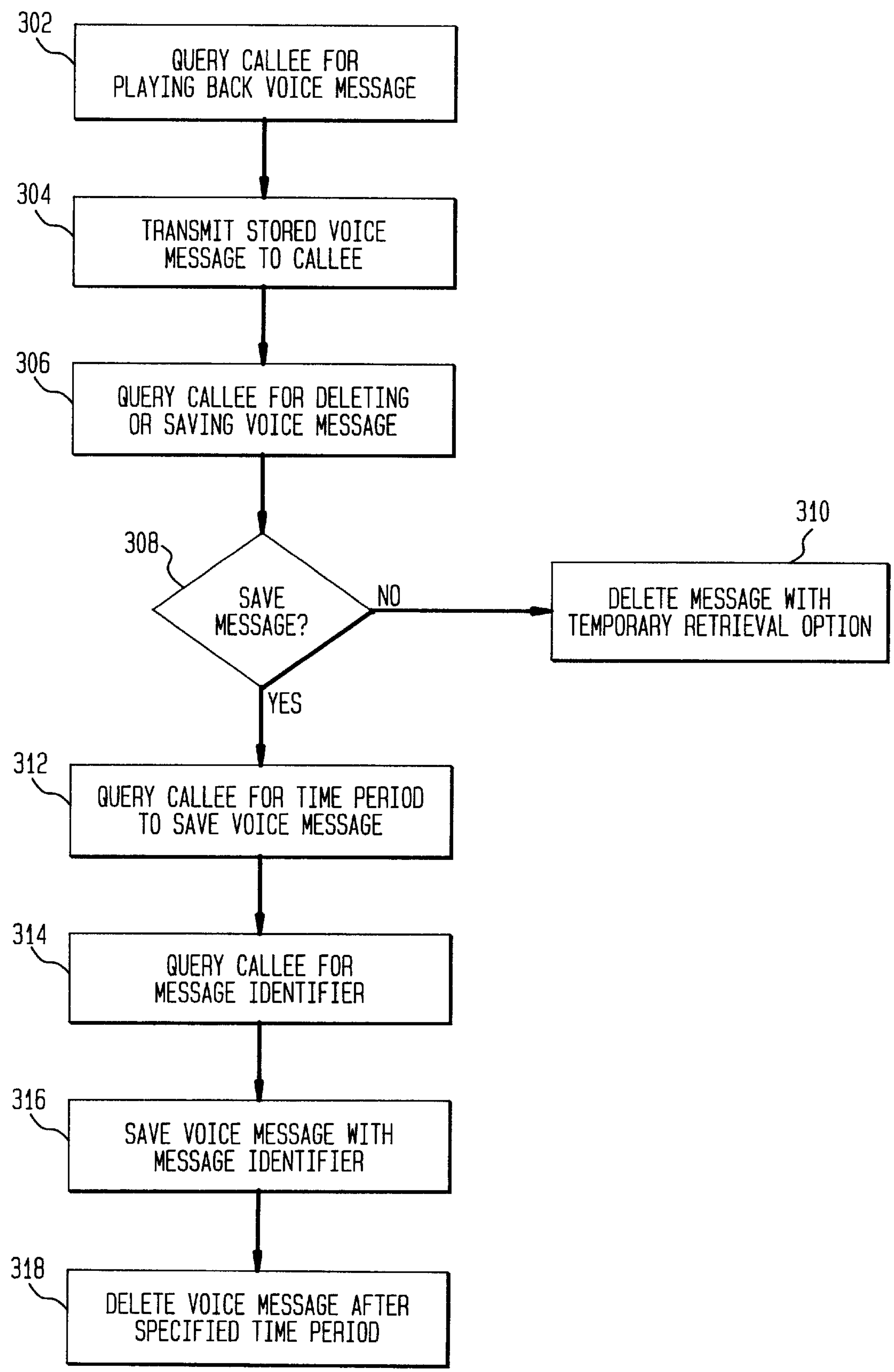
FIG. 3
302
QUERY CALLEE FOR PLAYING BACK VOICE MESSAGE
304
TRANSMIT STORED VOICE MESSAGE TO CALLEE
306
QUERY CALLEE FOR DELETING OR SAVING VOICE MESSAGE
308
SAVE MESSAGE?
NO
310
DELETE MESSAGE WITH TEMPORARY RETRIEVAL OPTION
YES
312
QUERY CALLEE FOR TIME PERIOD TO SAVE VOICE MESSAGE
314
QUERY CALLEE FOR MESSAGE IDENTIFIER
316
SAVE VOICE MESSAGE WITH MESSAGE IDENTIFIER
318
DELETE VOICE MESSAGE AFTER SPECIFIED TIME PERIOD

SPECIFIABLE DELETE TIMES FOR VOICE MESSAGING

BACKGROUND OF THE INVENTION

1. Field of the Invention

The present invention relates to telecommunications, and, in particular, to telecommunications systems that provide voice messaging.

2. Description of the Related Art

Voice messaging, whether provided by a local telephone answering machine or a network-based system, allows a caller to leave a voice message when the callee is not available to answer the call. When the callee later reviews the voice message, she is typically given the option of either deleting it or retaining it in memory for future processing, e.g., repeated playback. Whether deleting a message involves merely removing pointers or actually clearing memory space of the message bits, deleting means that the message is made unavailable for retrieval by the typical user of the voice-messaging system.

One of the limitations of conventional voice messaging systems is the finite amount of memory allocated to recording incoming voice messages from callers. When messages are saved indefinitely by a callee for future processing, the amount of memory available to record subsequent incoming messages is even further limited. As a result, subsequent callers may be unable to leave new messages if and when the allocated memory is completely filled with old messages. Likewise, when there are multiple outgoing messages, e.g., with specific messages being supplied for particular identified callers, such messages may have relevance for only a limited duration, yet take up memory until manually deleted or changed.

SUMMARY OF THE INVENTION

To alleviate these problems, in accordance with the principles of the invention, a voice messaging system is arranged to delete stored voice messages at a user-specified time on a per-voice-message basis. In accordance with an aspect of the invention, both caller-left messages as well as callee-stored messages may be associated with delete times and be deleted accordingly. Moreover, in accordance with another aspect of the invention, the delete time information for caller-left or callee-stored messages may be specified by the caller or the callee.

In one embodiment of the invention, a voice messaging system includes a processor connected to a memory for storing the incoming and outgoing voice messages. The processor automatically deletes each stored voice message after the occurrence of, or the elapsing of, a corresponding user-specified time in accordance with the principles of the invention.

BRIEF DESCRIPTION OF THE DRAWINGS

FIG. 3 shows a flow diagram of the processing implemented by the system of FIG. 1 when a callee retrieves a voice message from a caller.

DETAILED DESCRIPTION

The present invention addresses the limited memory resources of voice messaging systems. In particular, a voice messaging system of the present invention enables a user to specify a time for retaining each voice message. The time may be a particular length of time, e.g., a number of days or weeks, or a particular time of day, in hours and minutes, and date by month, day, and year. In one embodiment, the callee has the ability to specify the retention time when reviewing voice messages previously left by callers. In one variation of that embodiment, each caller is also able to specify a retention time when his voice message is initially recorded. In either case, the system will automatically delete the voice message after the retention time has expired if the callee has not, in the interim, extended that time.

Figure 1:
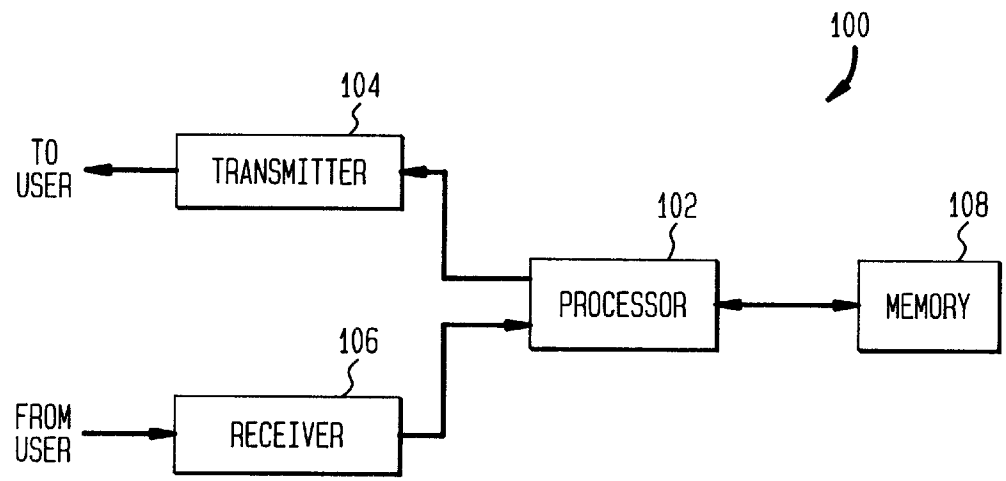
FIG. 1 shows a block diagram of a voice messaging system, according to one embodiment of the present invention.

FIG. 1 shows a block diagram of a voice messaging system 100, according to one embodiment of the present invention. Voice messaging system 100 could be a local telephone answering machine, such as a consumer product for the home or office, or a network-based system that provides voice messaging capabilities to multiple network users. For example, a network-based system could support all the employees at a company's office. Another type of network-based voice messaging system is resident in the central office of a telephone service provider and provides voice messaging capabilities to the customers of that service provider. The basic block diagram of FIG. 1 shows the functionality supported by a voice messaging system for any of these situations.

In particular, transmitter 104 of FIG. 1 transmits voice messages from system 100 to the user, receiver 106 receives voice messages and dual tone, multi-frequency (DTMF) signals from the user, e.g., generated in response to a user pressing the keys of a telephone keypad, and memory 108 stores both incoming and outgoing voice messages, e.g., in a compressed digital format. Processor 102 coordinates the activities of the other components of system 100, including the interpretation of information received by receiver 106, the generation of messages for transmission by transmitter 104, and the manipulation, e.g., storage, retrieval, and deleting, of voice messages from memory 108. When a caller uses system 100 to leave a voice message for a callee, the caller is the user of system 100. Similarly, when a callee uses system 100 to retrieve and process stored voice messages, or to generate outgoing voice messages for subsequent callers, the callee is the user of system 100. Memory 108 may be any suitable device for storing voice messages, including magnetic tape recorders and computer memory devices, such as hard drives and random access memory (RAM).

Figure 2:
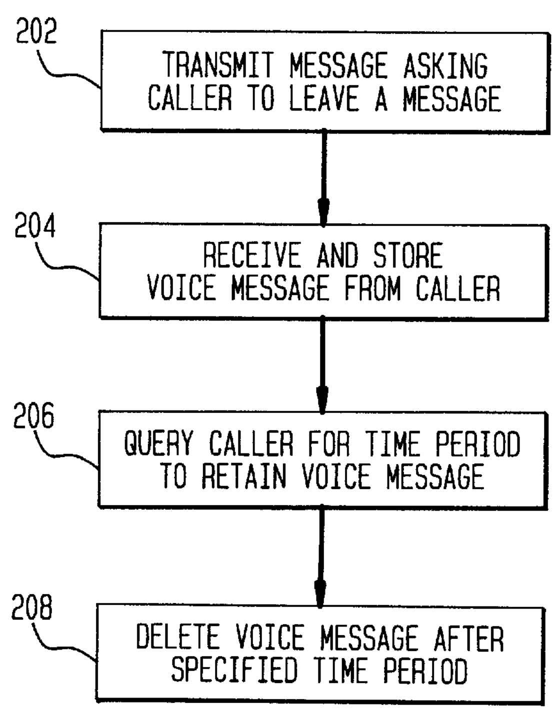
FIG. 2 shows a flow diagram of the processing implemented by the system of FIG. 1 when a caller leaves a voice message for a callee.

FIG. 2 shows a flow diagram of the processing implemented by system 100 of FIG. 1 when a caller leaves a voice message for a callee, according to one embodiment of the present invention. System 100 transmits a pre-recorded message to the caller asking the caller to leave a voice message (step 202 of FIG. 2). System 100 then receives and stores the voice message from the caller (step 204).

In one embodiment of the present invention, system 100 queries the caller for a time for retaining the current message (step 206). A system query involves transmitting an outgoing voice message to the caller asking the caller to enter a retention time for his message. Depending on the implementation, the caller may enter the retention time via DTMF signals or simply by speaking the desired date/time or time period. In either case, the system then processes the callee's response to implement the callee's selection. The caller is able to select any desired time for the system to retain the voice message. System 100 automatically deletes the voice message if the time expires before the callee retrieves the message (step 208).

Enabling the caller to specify a retention time for saving her voice message provides more efficient use of system memory resources. There are many times when callers leave messages that have relevance for only relatively short periods of time. For example, the message may be an invitation for the callee to join the caller at a specific event. The message may no longer be relevant if the callee has not retrieved the message after the event has already occurred. Allowing the caller to specify a retention time for retaining a voice message avoids filling the system's memory with irrelevant messages.

The retention time could be selected by duration, e.g., numbers of days or weeks, or by end time, e.g., identifying time and date of deletion by month, day, and year. System 100 preferably provides a default retention time for saving voice messages, which can be superseded by the caller specifying a different retention time. The default retention time could be to store a message indefinitely. System 100 also preferably gives the callee the ability to disable this function, so that all caller voice messages are retained indefinitely until after being reviewed by the callee.

FIG. 3 shows a flow diagram of the processing implemented by system 100 of FIG. 1 when a callee retrieves a voice message from a caller, according to one embodiment of the present invention. System 100 queries the callee about playing back stored voice messages (step 302 of FIG. 3). If the callee chooses to listen to the stored voice messages, system 100 transmits to the callee a recorded voice message previously left by a caller (step 304). System 100 then queries the callee for deleting or saving the current message (step 306). If the callee selects the delete option (step 308), system 100 deletes the message (step 310). Note that, in this embodiment of the present invention, system 100 provides the callee, for a certain period of time, e.g., 1 hour or 1 day, with the option of retrieving a deleted voice message. This would allow a callee to retrieve and save a voice message that was accidentally or inadvertently deleted.

If the callee selects the message save option (step 308), system 100 queries the callee for a retention time for saving the current voice message (step 312). The callee is able to select a different retention time for each voice message saved. System 100 preferably provides a default retention time for saving voice messages. The retention time could be selected by duration, e.g., numbers of days or weeks, or by end time, e.g., identifying time and date of deletion by month, day, and year.

In addition, system 100 may also be designed to query the callee for a message identifier (step 314). A message identifier identifies the message as belonging to a particular category of messages, for example, messages from the callee's mother or messages from different people about the same topic, e.g., responses to an invitation to a party. The message identifier could be a word or phrase spoken by the callee or one or more DTMF signals corresponding to the desired category. In such an embodiment, system 100 would provide the callee with the ability to retrieve stored messages category by category.

In another possible embodiment of the present invention, system 100 is able to interpret the voice message left by the caller to generate automatically a message identifier for the message. Such message interpretation is described in U.S. Pat. No. 5,504,805, the teachings of which are incorporated herein by reference. This could occur, for example, if the callee fails to provide a message identifier. In this case, the message identifier could be the caller's phone number or caller's name, which would be identified by interpreting the voice message. Alternatively, the caller's phone number could be provided by a caller ID function for use in a message identifier.

In any case, system 100 saves the current voice message, categorized according to the message identifier for those embodiments that support message identifiers (step 316). After the specified retention time expires, without the callee in the interim otherwise extending the retention time, system 100 will automatically delete the voice message (step 318). This feature prevents memory 108 of voice messaging system 100 from getting filled with old messages that may or may not be of further importance to the callee. This feature is particularly useful in network-based voice messaging systems where any number of users may be competing with the limited and potentially expensive memory resources of the system. The present invention prevents users from abusing the voice messaging system by retaining messages indefinitely at the expense of the system's ability to record new messages.

In one embodiment of the present invention, a callee can store voice messages for playback as outgoing messages to subsequent callers and assign individual retention times to these outgoing messages. Each outgoing message may be designated for specific callers, e.g., as identified from CallerID information, for specific groups of callers, or even for all callers. In any case, the system automatically deletes a voice message at the expiration of its corresponding retention time.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for manipulating voice messages from a caller to a callee, comprising the steps of:

(a) transmitting to the caller an outgoing message, during a telephone call placed on behalf of the caller in an attempt to communicate with the callee, indicating that the callee is not available to answer the telephone call;

(b) storing a voice message from the caller during the telephone call, in response to the outgoing message, in a memory location accessible by the callee;

(c) assigning a user-specified retention time for retaining the stored voice message in the callee's memory location, wherein the callee can access the stored voice message in the callee's memory location at any time prior to expiration of the retention time; and (d) automatically deleting the stored voice message from the callee's memory location after expiration of the retention time.

2. The invention of claim 1, wherein the caller specifies the retention time approximately when the voice message is recorded.

3. The invention of claim 2, further comprising the step of the callee disabling the ability of the caller to specify the retention time.

4. The invention of claim 2, further comprising the step of the callee changing the retention time set by the caller.

5. The invention of claim 1, wherein the callee specifies the retention time approximately when the voice message is retrieved.

6. The invention of claim 1, wherein each voice message can have a different retention time.

7. The invention of claim 1, wherein the callee is able to specify a message identifier for saving a stored voice message as one of a particular category of voice messages for subsequent processing.

8. The invention of claim 1, wherein a voice message is automatically interpreted to generate a message identifier.

9. An apparatus for manipulating voice messages from a caller to a callee, comprising:

(a) means for transmitting to the caller an outgoing message, during a telephone call placed on behalf of the caller in an attempt to communicate with the callee, indicating that the callee is not available to answer the telephone call;

(b) means for storing a voice message from the caller during the telephone call, in response to the outgoing message, in a memory location accessible by the callee;

(c) means for assigning a user-specified retention time for retaining the stored voice message in the callee's memory location, wherein the callee can access the stored voice message in the callee's memory location at any time prior to expiration of the retention time; and (d) means for automatically deleting the stored voice message from the callee's memory location after expiration of the retention time.

10. The invention of claim 9, wherein the caller specifies the retention time approximately when the voice message is recorded.

11. The invention of claim 10, further comprising means for disabling by the callee the ability of the caller to specify the retention time.

12. The invention of claim 10, further comprising means for changing by the callee the retention time set by the caller.

13. The invention of claim 9, wherein the callee specifies the retention time approximately when the voice message is retrieved.

14. The invention of claim 9, wherein each voice message can have a different retention time.

15. The invention of claim 9, wherein the callee is able to specify a message identifier for saving a stored voice message as one of a particular category of voice messages for subsequent processing.

16. The invention of claim 9, wherein a voice message is automatically interpreted to generate a message identifier.

17. An apparatus for manipulating voice messages from a caller to a callee, comprising:

(a) a memory device adapted to store a voice message from the caller in a memory location accessible by the callee during a telephone call placed on behalf of the caller in an attempt to communicate with the callee; and (b) a processor adapted to transmit to the caller an outgoing message during the telephone call indicating that the callee is not available to answer the telephone call, adapted to assign a user-specified retention time for retaining the stored voice message in the callee's memory location, and further adapted to automatically delete the stored voice message from the callee's memory location after expiration of the retention time, wherein the callee can access the stored voice message in the callee's memory location at any time prior to expiration of the retention time.

18. The invention of claim 17, wherein the caller specifies the retention time approximately when the voice message is recorded.

19. The invention of claim 18, wherein the processor enables the callee to disable the ability of the caller to specify the retention time.

20. The invention of claim 18, wherein the processor enables the callee to change the retention time set by the caller.

21. The invention of claim 17, wherein the callee specifies the retention time approximately when the voice message is retrieved.

22. The invention of claim 17, wherein each voice message can have a different retention time.

23. The invention of claim 17, wherein the callee is able to specify a message identifier for saving a stored voice message as one of a particular category of voice messages for subsequent processing.

24. The invention of claim 17, wherein a voice message is automatically interpreted to generate a message identifier.

25. A method for manipulating voice messages from a caller to a callee, comprising the steps of:

(a) storing a voice message during a telephone call placed on behalf of the caller in an attempt to communicate with the callee;

(b) assigning a user-specified retention time for retaining the stored voice message; and (c) automatically deleting the stored voice message after expiration of the retention time, wherein:

the caller specifies the retention time approximately when the voice message is recorded; and further comprising the step of the callee disabling the ability of the caller to specify the retention time.

26. A method for manipulating voice messages from a caller to a callee, comprising the steps of:

(a) storing a voice message during a telephone call placed on behalf of the caller in an attempt to communicate with the callee;

(b) assigning a user-specified retention time for retaining the stored voice message; and (c) automatically deleting the stored voice message after expiration of the retention time, wherein:

the caller specifies the retention time approximately when the voice message is recorded; and further comprising the step of the callee changing the retention time set by the caller.

27. A method for manipulating voice messages from a caller to a callee, comprising the steps of:

(a) storing a voice message during a telephone call placed on behalf of the caller in an attempt to communicate with the callee;

(b) assigning a user-specified retention time for retaining the stored voice message; and (c) automatically deleting the stored voice message after expiration of the retention time, wherein the callee specifies the retention time approximately when the voice message is retrieved.

28. A method for manipulating voice messages from a caller to a callee, comprising the steps of:

(a) storing a voice message during a telephone call placed on behalf of the caller in an attempt to communicate with the callee;

(b) assigning a user-specified retention time for retaining the stored voice message; and (c) automatically deleting the stored voice message after expiration of the retention time, wherein the callee is able to specify a message identifier for saving a stored voice message as one of a particular category of voice messages for subsequent processing.

29. An apparatus for manipulating voice messages from a caller to a callee, comprising:

(a) means for storing a voice message during a telephone call placed on behalf of the caller in an attempt to communicate with the callee;

(b) means for assigning a user-specified retention time for retaining the stored voice message; and (c) means for automatically deleting the stored voice message after expiration of the retention time, wherein:
the caller specifies the retention time approximately when the voice message is recorded; and
further comprising means for disabling by the callee the ability of the caller to specify the retention time.

30. An apparatus for manipulating voice messages from a caller to a callee, comprising:

(a) means for storing a voice message during a telephone call placed on behalf of the caller in an attempt to communicate with the callee;

(b) means for assigning a user-specified retention time for retaining the stored voice message; and (c) means for automatically deleting the stored voice message after expiration of the retention time, wherein:
the caller specifies the retention time approximately when the voice message is recorded; and
further comprising means for changing by the callee the retention time set by the caller.

31. An apparatus for manipulating voice messages from a caller to a callee, compriseing:

(a) means for storing a voice message during a telephone call placed on behalf of the caller in an attempt to communicate with the callee;

(b) means for assigning a user-specified retention time for retaining the stored voice message; and (c) means for automatically deleting the stored voice message after expiration of the retention time, wherein the callee specifies the retention time approximately when the voice message is retrieved.

32. An apparatus for manipulating voice messages from a caller to a callee, comprising:

(a) means for storing a voice message during a telephone call placed on behalf of the caller in an attempt to communicate with the callee;

(b) means for assigning a user-specified retention time for retaining the stored voice message; and (c) means for automatically deleting the stored voice message after expiration of the retention time, wherein the callee is able to specify a message identifier for saving a stored voice message as one of a particular category of voice messages for subsequent processing.

33. An apparatus for manipulating voice messages from a caller to a callee, comprising:

(a) a memory device adapted to store a voice message during a telephone call placed on behalf of the caller in an attempt to communicate with the callee; and (b) a processor adapted to assign a user-specified retention time for retaining the stored voice message and further adapted to automatically delete the stored voice message after expiration of the retention time, wherein:
the caller specifies the retention time approximately when the voice message is recorded; and
the processor enables the callee to disable the ability of the caller to specify the retention time.

34. An apparatus for manipulating voice messages from a caller to a callee, comprising:

(a) a memory device adapted to store a voice message during a telephone call placed on behalf of the caller in an attempt to communicate with the callee; and (b) a processor adapted to assign a user-specified retention time for retaining the stored voice message and further adapted to automatically delete the stored voice message after expiration of the retention time, wherein:
the caller specifies the retention time approximately when the voice message is recorded; and
the processor enables the callee to change the retention time set by the caller.

35. An apparatus for manipulating voice messages from a caller to a callee, comprising:

(a) a memory device adapted to store a voice message during a telephone call placed on behalf of the caller in an attempt to communicate with the callee; and (b) a processor adapted to assign a user-specified retention time for retaining the stored voice message and further adapted to automatically delete the stored voice message after expiration of the retention time, wherein the callee specifies the retention time approximately when the voice message is retrieved.

36. An apparatus for manipulating voice messages from a caller to a callee, comprising:

(a) a memory device adapted to store a voice message during a telephone call placed on behalf of the caller in an attempt to communicate with the callee; and (b) a processor adapted to assign a user-specified retention time for retaining the stored voice message and further adapted to automatically delete the stored voice message after expiration of the retention time, wherein the callee is able to specify a message identifier for saving a stored voice message as one of a particular category of voice messages for subsequent processing.

* * * * *

UNITED STATES PATENT AND TRADEMARK OFFICE

CERTIFICATE OF CORRECTION

PATENT NO. : 6,137,864

DATED : October 24, 2000

INVENTOR(S) : Rhoda Yaker

It is certified that error appears in the above-identified patent and that said Letters Patent are hereby corrected as shown below:

On the title page in Section 56, References Cited, add:

--5,664,060 9/1997 Jarrett et al.--.

Signed and Sealed this

Fifteenth Day of May, 2001

Attest:

NICHOLAS P. GODICI

*Attesting Officer* *Acting Director of the United States Patent and Trademark Office*